July 24, 1928.
A. K. BRUMBAUGH
1,678,033
STORAGE BATTERY CONTAINER
Filed Feb. 23, 1924    4 Sheets-Sheet 1
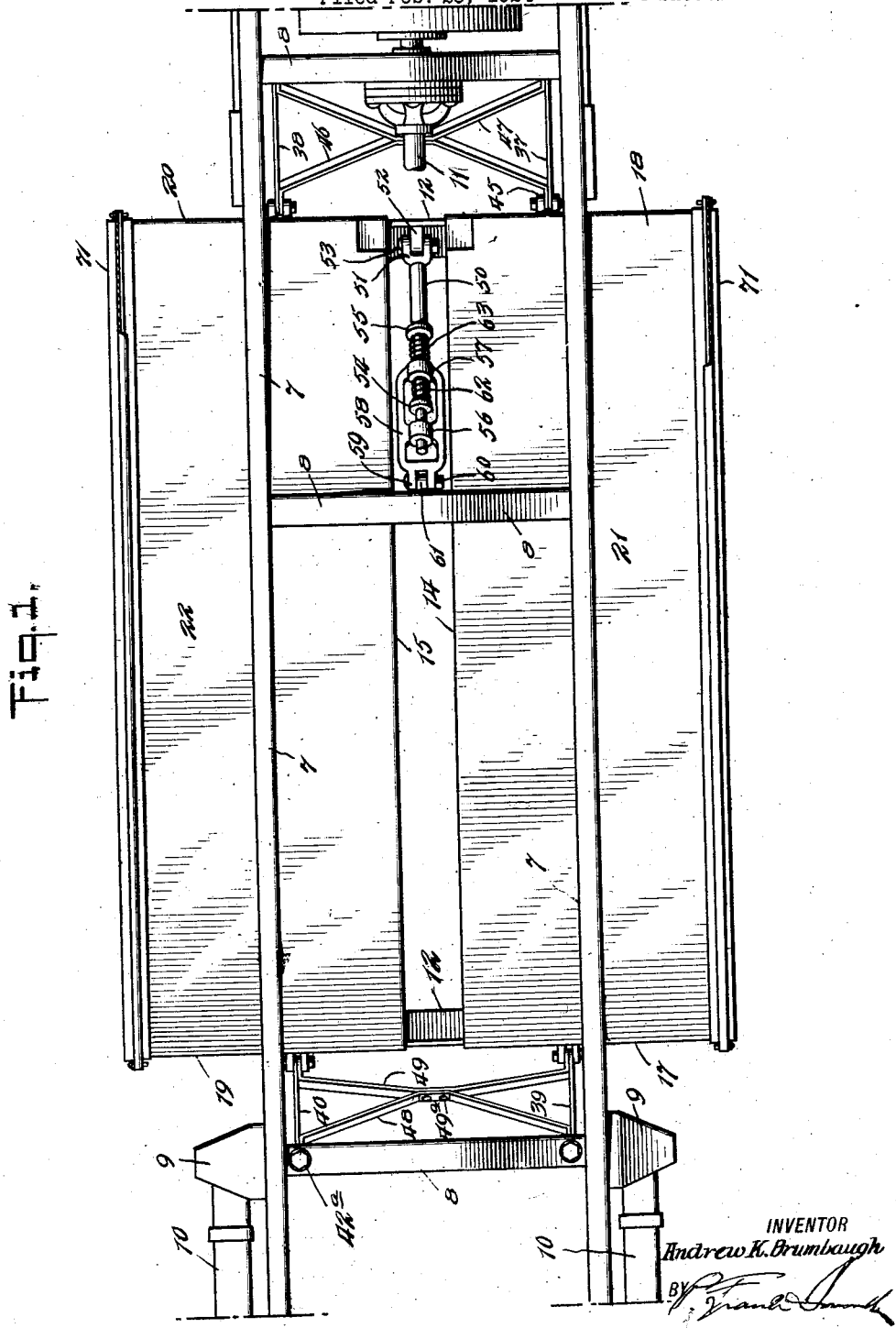
Fig.1.
INVENTOR
Andrew K. Brumbaugh
BY 
ATTORNEY

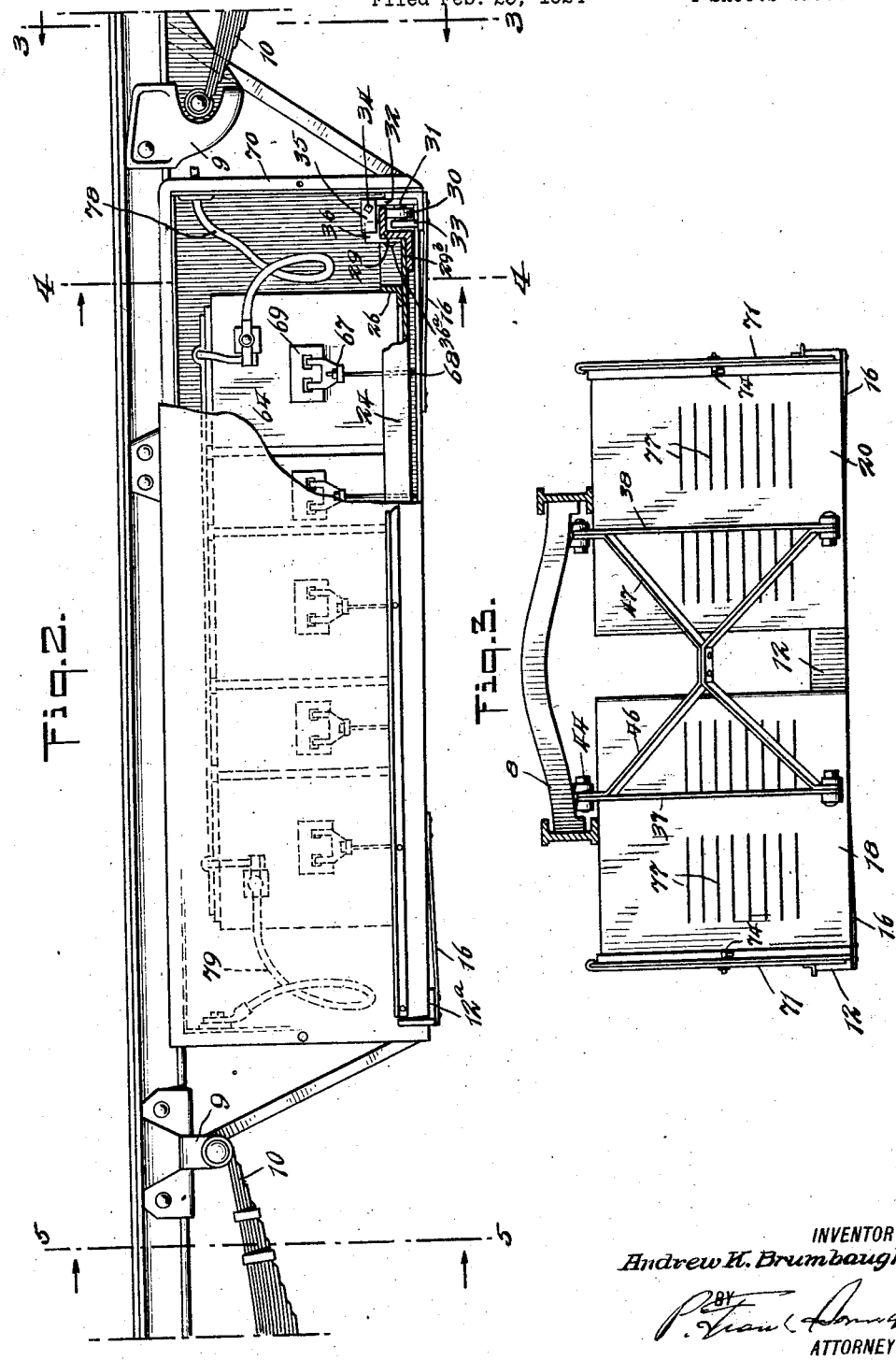

July 24, 1928.  A. K. BRUMBAUGH  1,678,033

STORAGE BATTERY CONTAINER

Filed Feb. 23, 1924  4 Sheets-Sheet 3

INVENTOR
Andrew K. Brumbaugh
BY
ATTORNEY

July 24, 1928.
A. K. BRUMBAUGH
1,678,033
STORAGE BATTERY CONTAINER
Filed Feb. 23, 1924    4 Sheets-Sheet 4
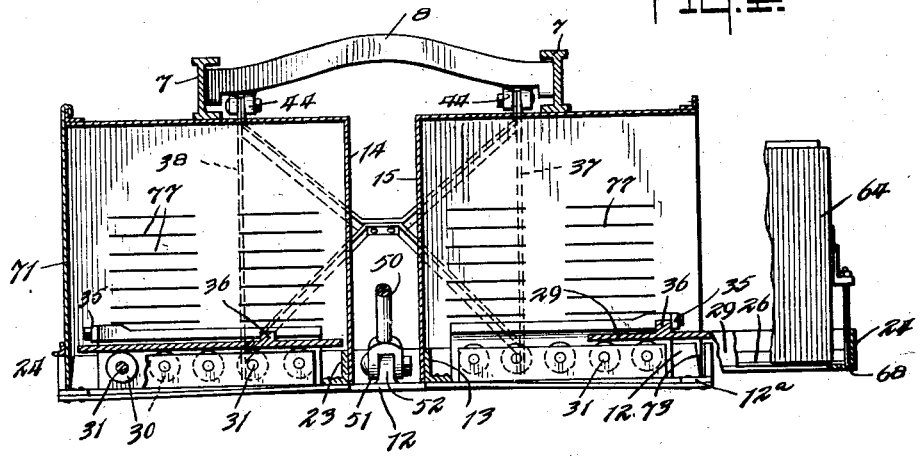
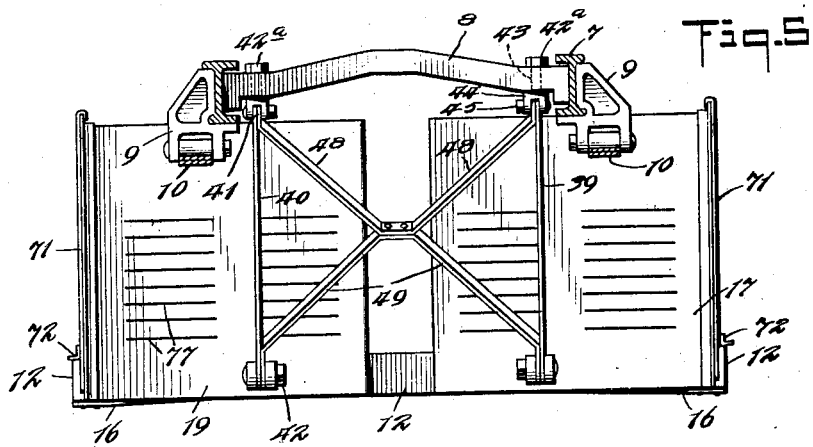
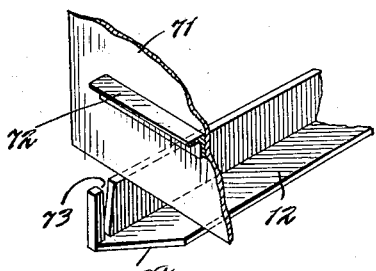
INVENTOR
Andrew K. Brumbaugh
BY
ATTORNEY Patented July 24, 1928.

1,678,033

UNITED STATES PATENT OFFICE.

ANDREW K. BRUMBAUGH, OF ARDMORE, PENNSYLVANIA, ASSIGNOR TO THE AUTOCAR COMPANY, OF ARDMORE, PENNSYLVANIA, A CORPORATION OF PENNSYLVANIA.

STORAGE-BATTERY CONTAINER.

Application filed February 23, 1924. Serial No. 694,662.

The present invention relates generally to improvements in electrically driven motor vehicles, and is more especially directed to a method and means for supporting the storage batteries from which the current for operating the motor is received.

As is well known, in order to conserve the useful load space in electric motor vehicles, it has been the practice to suspend the battery carrier or cradle beneath the frame of the vehicle. These carriers or cradles are rigidly secured to the frame members by various methods, and it is obvious that, in effect, they thereby become substantially integral elements of the frame construction. This practice of mounting the battery carriers or cradles possesses many disadvantages in that the carrier and the batteries contained therein are subject to strains and stresses resulting from the weaving of the vehicle frame and from the shocks which are transmitted thereto in the operation of the vehicle. This is especially true as applied to electrically driven trucks and other commercial vehicles, which are frequently backed against curbing or unloading platforms at a speed which subjects the battery carrier to shocks and stresses which quickly impair its serviceability, and results in the loosening of the battery supporting mediums, so that frequent repairs and adjustments are necessary. Furthermore, in the so-called rigidly mounted types of battery carriers, the batteries are relatively inaccessible. Therefore, when it is necessary to fill the batteries with water or to remove them for repair or other purposes, the vehicle must be withdrawn from service for a considerable period of time, with a consequent loss.

Attempts have been made to obviate the disadvantages flowing from the inaccessibility of the batteries in the aforesaid rigidly mounted carriers, by providing a so-called tray which is bodily detachable or demountable from the carrier and within which the batteries are contained. However, the demounting of these trays calls for the use of auxiliary apparatus, such as lift trucks or elevators, and it is evident that the necessity for these auxiliary appliances means additional expense in the maintenance of a fleet of vehicles, and also renders roadside repairs or adjustments to the battery extremely difficult unless such appliances are at hand.

The general object of the present invention is to provide a simple and economical method or means of supporting battery carriers from the frame of a motor vehicle, so that the disadvantages residing in the employment of a rigidly mounted carrier, whether of the fixed or demountable tray type, will be positively eliminated, with a resultant increase in the durability of the carrier and the life of the batteries, while at the same time permitting of the handling of the batteries with greater facility than has heretofore been possible and without the use of auxiliary appliances.

More specifically, the object of this invention is to provide a method and means of mounting a battery carrier on the frame of a motor vehicle, in a manner whereby the battery carrier or cradle will be capable of movement relative to the vehicle frame to an extent which will effectively cushion and protect the carrier or cradle, and the batteries contained therein, from road shocks and jars, so that the destructive concentrated stresses inherent to the rigid suspension construction are entirely eliminated.

A further object of this invention is to provide a battery carrier movably suspended from the vehicle frame as aforesaid, in which the batteries are supported on a medium or unit cooperatively associated with certain other elements of the carrier to render it capable of lateral movement to an extent which will expose the batteries, so that any necessary work thereon may be performed with facility and dispatch, without the use of auxiliary appliances, such as lift trucks, jacks, elevators, or the like.

My invention also comprehends a structure as aforesaid in which, when conditions make it necessary or it is so desired, the battery tray or container may be bodily removed or demounted from the carrier with the expenditure of a minimum amount of effort as compared to the structures of the prior art.

This invention also contemplates the provision of a housing or enclosure for the battery in which the various elements or components cooperate to afford ample protection to the batteries against damage from extraneous sources, the housing being so constructed that access may be had to the interior thereof by the removal of a protecting element, which may be quickly accomplished without the employment of tools or other implements.

Other objects of this invention, and many advantages flowing from the practicing thereof, will become manifest as the description proceeds, and I would have it understood that I reserve unto myself all rights to the full range of equivalents, both in structure and in use, to which I may be entitled under my invention in its broadest aspect.

For the purposes of the present disclosure, I have elected to illustrate and describe a preferred and practical embodiment of my invention as applied to electric vehicles of the commercial type, but it will be evident that changes may be made in structural details and arrangement of the parts, without departing from the spirit and scope of my invention as defined by the appended claims.

In the drawings:

Fig. 1 is a top plan view of a part of the chassis of an electrically driven motor vehicle, showing my improved type of battery carrier incorporated in the structure thereof.

Fig. 2 is a side elevation of the structure shown in Fig. 1, a part of the closure for the battery compartment being broken away to expose the interior of the carrier and the cooperative relation of the elements thereof.

Fig. 3 is an end view, taken from the line 3—3 of Fig. 2.

Fig. 4 is a transverse section, looking in the direction of the arrows as indicated by the line 4—4 of Fig. 2.

Fig. 5 is an end elevation, taken from the line 5—5 of Fig. 2.

Fig. 7 is a fragmentary detail illustrating the means employed for mounting the closure in functioning position, and Fig. 8 is a fragmentary detail, in perspective, showing the interlocking elements of the closure and cradle or carrier.

Figure 6:
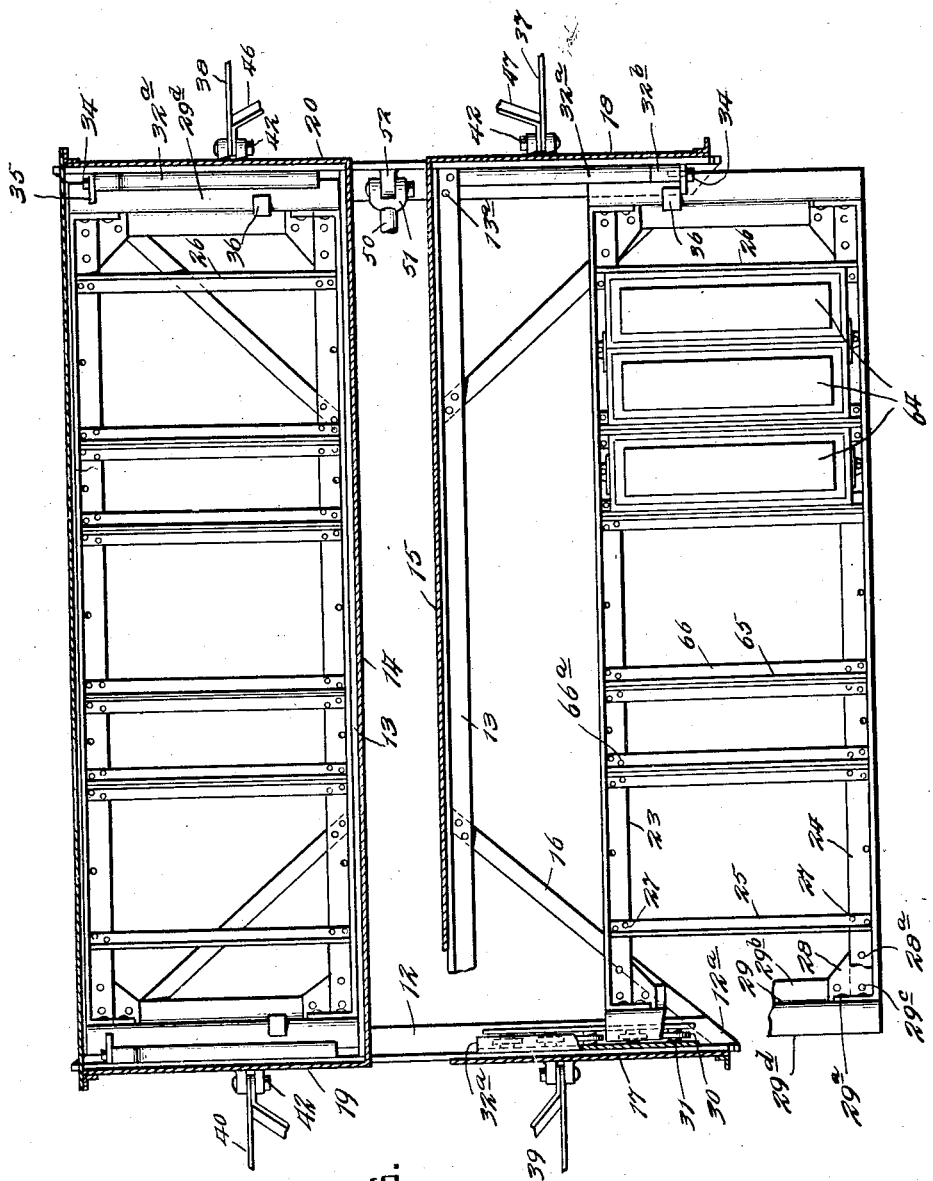
Fig. 6 is a longitudinal sectional view of the battery compartments, showing one of the trays in extended position.

Referring now to the drawings in detail, in which like characters of reference are employed to designate similar parts throughout the several views, 7 indicates the longitudinal frame members, and 8 the transverse frame members, of a motor vehicle chassis, the usual spring hangers or supports and the vehicle springs being indicated by the reference characters 9 and 10, respectively.

As will be observed, my improved type of battery carrier comprises two compartments, paralleling each other, one being located on each side of the propeller or driving shaft 11 of the vehicle, the two compartments being connected at each end by an angle iron 12, disposed transversely of the vehicle frame and movably suspended from the transverse frame members 8 of the vehicle, as will be hereinafter more clearly described.

The aforesaid angle irons 12 are tied or connected by the longitudinally disposed angle irons 13 which are rigidly secured thereto, as by rivets 13$^a$, and spaced from each other to form supports for the rear walls 14 and 15 of the respective battery compartments. A rectangular frame for each compartment is thus formed, the corners of each frame being braced by the angularly disposed pieces 16 of flat stock riveted or otherwise rigidly secured to the members 12 and 13, the ends of the transverse members 12 being preferably chamfered as shown at 12$^a$ to register with the abutting portions of said pieces 16.

Each battery compartment, formed by the aforesaid rear walls 14 and 15, and the associated end walls 17, 18, 19 and 20, supported upon the transverse angle irons 12 and connected by the top members 21 and 22, is provided with a battery tray movably mounted therein as and for the purposes hereinafter set forth.

The battery tray for each compartment is of a rectangular configuration and embodies the longitudinal frame members 23 and 24, preferably of angle iron, which are connected inwardly of their ends by the transverse angle irons 25 and 26, the said longitudinal and cross-members being rigidly fastened together by means of the rivets 27 seated in the abutting web portions thereof.

An angle plate 28 is riveted at 28$^a$ to each end of the longitudinal frame members 23 and 24, the flanges of these plates at each end of the tray frame being similarly fixed to the web portions of the cross end members 29 as shown at 29$^a$. These cross end members 29, as will be noted, have oppositely directed flanges at the top and bottom of the web thereof, the lower flange 29$^b$ underlying the angle plate 28 to which it is secured by the rivets 29$^c$, while the upper flange 29$^d$ extends outwardly of the frame of the tray and is adapted to engage and ride or track upon the rollers 30 carried on stubs 31.

One end of each of these stubs 31 is mounted in a suitable bearing provided in the web portion of the inverted angle or L section 32 which is riveted, welded or otherwise permanently secured to the flange of the transverse angle iron 12 of the cradle, the other end thereof being journaled in a flat stock cross member 33 paralleling the web of the member 32 and immovably supported, in any suitable manner, from the web portion of said angle iron 12.

The flange 32$^a$ of the L section 32, it will be observed, overlies the flange 29$^d$ of the member 29 so as to limit possible vertical movement of the tray when the vehicle is in motion and prevent tipping or tilting thereof when it is withdrawn from the compartment.

The end of said flange 32ª, adjacent to the open side of the compartment, is stepped up at 32ᵇ and provided with a dependent flange having a threaded aperture for the stud 34, whereby the plate 35 will function as a stop to limit the withdrawal or lateral movement of the tray, the said plate, it will be noted, being disposed in the path of movement of the angle piece 36 riveted at 36ª to the web of the cross member 29, as shown in Figure 2.

As heretofore described, the battery cradle or carrier is mounted so as to be capable of movement relative to the vehicle frame, in the direction of travel of the vehicle, and to accomplish this I suspend the battery carrier or cradle beneath the vehicle frame by means of the inclined links 37, 38, 39 and 40 arranged in pairs, fore and aft thereof, which are braced or cross-stayed to promote lateral stability, as shown at 46, 47, 48 and 49. The upper and lower ends of the links of each pair and the co-operating portions of their cross-stays are hinged to the adjacent transverse frame member of the vehicle frame and the end of the platform or angle iron frame of the battery carrier or cradle respectively, as shown at 41 and 42. Any suitable method of forming these hinged connections may be followed, but I have found that an economical and strong bracket for connecting the upper ends of the links to the vehicle frame member may be obtained by suitably drilling the frame member to receive bolts 43, each of which is provided with a securing nut 42ª and clevis or bifurcated head 44, apertured for reception of the cross-pin or bolt 45, while the bracket for the lower ends of the links may be of the configuration shown, and welded, riveted or otherwise secured to the flange of the transverse member 12 or to the end walls of the battery compartments.

From the description of the mounting of the battery carrier cradle it will be obvious that it is desirable to provide means for controlling or governing its movement relative to the vehicle frame so as to confine it within certain limits. To this end, I employ a yieldable link located between the two battery compartments and connected to one of the platform members of the battery carrier or cradle and to a transverse member of the vehicle frame. This yieldable link is preferably inclined and may be of any form which will attain the objects of my invention, a highly efficient and durable type being clearly shown in Figure 1 herein, which comprises a rod 50 having a bifurcated or clevis end 51 adapted to be hinged to a bracket 52 supported from the inner face of the flange of the forward transverse platform member 12 by means of the bolt 53. This rod 50 is provided with shoulders or collars 54 and 55 intermediate its ends and is capable of reciprocatory movement within the bearings 56 and 57 provided on the yoke-member 58, the clevis end 59 of which is pivotally connected by means of the bolt 60 to the bracket 61 on the flange of the vehicle frame 8. Suitable coil springs 62 and 63 are positioned upon the rod 50 between the shoulder or collar 54 and the bearing member 57 of the yoke 58 and between the shoulder or collar 55 and said bearing member 57 respectively. It will be evident from this arrangement that any swinging or rocking movement of the suspended weight, due to the rotation of the inclined supporting links upon their pivots, will be effectively controlled by the action of the springs 62 and 63 and the battery effectively cushioned against all shocks or jars resulting from the motion of the vehicle or otherwise.

The battery cells, shown at 64, are located within the trays and in engagement with the flanges 65 of the angle irons 66, which are arranged transversely of the tray and riveted or otherwise positively secured to the web of the longitudinal tray members 23 and 24 as shown at 66ª. These transverse members 66 may be spaced in any suitable relation, as indicated in Figure 6, so as to provide partitions between which one, two, or more cells may be located.

The battery cells are retained or locked in position by means of the usual adjustable hooks or clamps 67, hinged to the web of the longitudinal member 24, at 68, and adapted to engage the slotted plate 69 located on the end wall of the battery cell.

As will be noted, a rim or flange 70, which may be integral with the end and top members of the battery compartment, or may be formed by affixing an angle iron thereto, provides a seat for the compartment cover plate or closure 71. This cover plate has secured thereto a piece of angle iron 72 which forms a grip whereby said cover plate may be lifted or raised out of the slot 73 formed in the flange of the cross members 12 adjacent to the outer ends thereof, the cover plate when seated in said slot being retained in engagement with said rim or flange 70 by means of the breakable pin 74 which is adapted to pass through registering apertures 75 and 76 in said closure and said rim or flange 70 respectively.

From the foregoing description of my invention, it will be clearly manifest that I have devised a method and means of transporting the battery equipment of a motor vehicle in a manner which will materially reduce maintenance charges and at the same time increase the life of the complete unit.

The hinged mounting of the cradle or carrier and the yieldable or compensating control co-operating therewith, effectively cushions the battery against all shocks. Further, the accessibility of the batteries when the trays are withdrawn enables one to readily perform the necessary functions for maintaining the batteries at their highest efficiency, and this may be done without disconnecting or breaking the leads 78 and 79. In those cases, where it may be found necessary or desirable to remove the tray, this may be effected by the simple expedient of removing the stud 34 and the stop plate 35 held in functioning position thereby. Obviously, the tray may then be completely withdrawn or detached from the compartment.

Proper ventilation of the compartments is obtained by the provision of suitable louvres 77 in the ends thereof, so that while the batteries are completely enclosed when the cover plate or closure 71 is in position, the disadvantages of those structures through which the air does not freely circulate are overcome.

While I have described my invention with reference to the specific embodiment shown herein, it will be evident that various changes in the structural details may be made without departing from the spirit and scope thereof as defined by the annexed claims.

What is claimed is:

1. A storage battery carrier, for motor vehicles, comprising spaced members adapted to be disposed transversely beneath the frame of the vehicle, for supporting battery compartments, means for connecting each of said supporting members to the frame of a motor vehicle whereby said battery carrier will be capable of oscillatory movement in the direction of travel of the vehicle, and a yieldable element connected to one of said supporting members intermediate of said compartments, said yieldable element being adaptable for movable connection to the vehicle frame for controlling the oscillation of the battery carrier.

2. A storage battery carrier, comprising a pair of angle irons adapted to be disposed transversely of a vehicle frame and in spaced relation to each other, means for rigidly connecting said angle irons, means pivotally connected to each of said angle irons and adapted for hinged connection with a transverse member of the motor vehicle frame, and a shock absorbing element connected to one of said supporting members, said shock absorbing element being adapted for pivotal connection to a third transverse member of the vehicle frame.

3. Means for supporting a storage battery carrier from the frame of a motor vehicle comprising hangers adapted for pivotal connection to the carrier and to the vehicle frame, and a yieldable element interposed between the said carrier and the vehicle frame for controlling the movement of said hangers, said yieldable element being independent of said hangers.

4. Means for supporting a storage battery carrier from the frame of a motor vehicle comprising a rigid hanger pivotally connected to each end of the carrier, each of said hangers being adapted for pivotal connection to the vehicle frame, and means independent of said hangers for yieldably controlling the movement of the carrier relative to the vehicle frame when suspended therefrom.

5. A storage battery carrier for motor vehicles comprising a battery support, means having hinged connections with said support and the frame of the vehicle for suspending said carrier from said frame for relative longitudinal movement, and a yieldable device connected to said carrier and a part of the vehicle, adapted to yieldably control such longitudinal movement of said carrier.

6. The combination with a storage battery carrier for motor vehicles, of means for suspending said carrier from the frame of the vehicle for relative fore and aft movement, said means including hangers having hinged connections with said carrier and said vehicle frame, and a yieldable element connected to said carrier and to a part of the vehicle for controlling the fore and aft movement of the carrier.

7. The combination with a storage battery carrier for motor vehicles, of means for suspending said carrier from the frame of the vehicle, said means including rigid diagonally disposed hanger members hinged to said carrier and to a part of the vehicle, whereby said carrier may reciprocate longitudinally of the vehicle frame, and a device connected to said carrier and to a part of the vehicle for cushioning such reciprocal movement of the carrier.

8. A storage battery carrier comprising members adapted to support a pair of battery compartments, means having hinged connections with each end of said carrier and a part of the vehicle whereby such carrier may be slung beneath the vehicle frame so that one of such compartments will be disposed on each side of the propeller shaft of the vehicle and a shock absorbing element for cushioning the hinged movement of said carrier.

9. A battery carrier for vehicles, comprising bed-members, hangers embodying rigid parallel members diagonally braced hinged to said bed-members and adapted for pivotal connection to a part of a vehicle, and an element for controlling the relative movement of said hangers and said bed-members, said element including devices hinged to a bed-member and to a part of the vehicle and yieldable means connecting said devices.

10. A battery carrier for vehicles comprising a battery supporting frame, rigid means connected to said frame and adapted for connection to a part of the vehicle, whereby said frame will be capable of horizontal reciprocation, and means for yieldably controlling such movement of said frame.

11. Means for carrying a storage battery beneath the frame of a motor-vehicle, comprising a rigid support, rigid hangers adapted for swingably connecting each end of said support to the vehicle frame and means yieldable in the direction of movement of said support to control such movement.

ANDREW K. BRUMBAUGH.